Patented May 15, 1928.

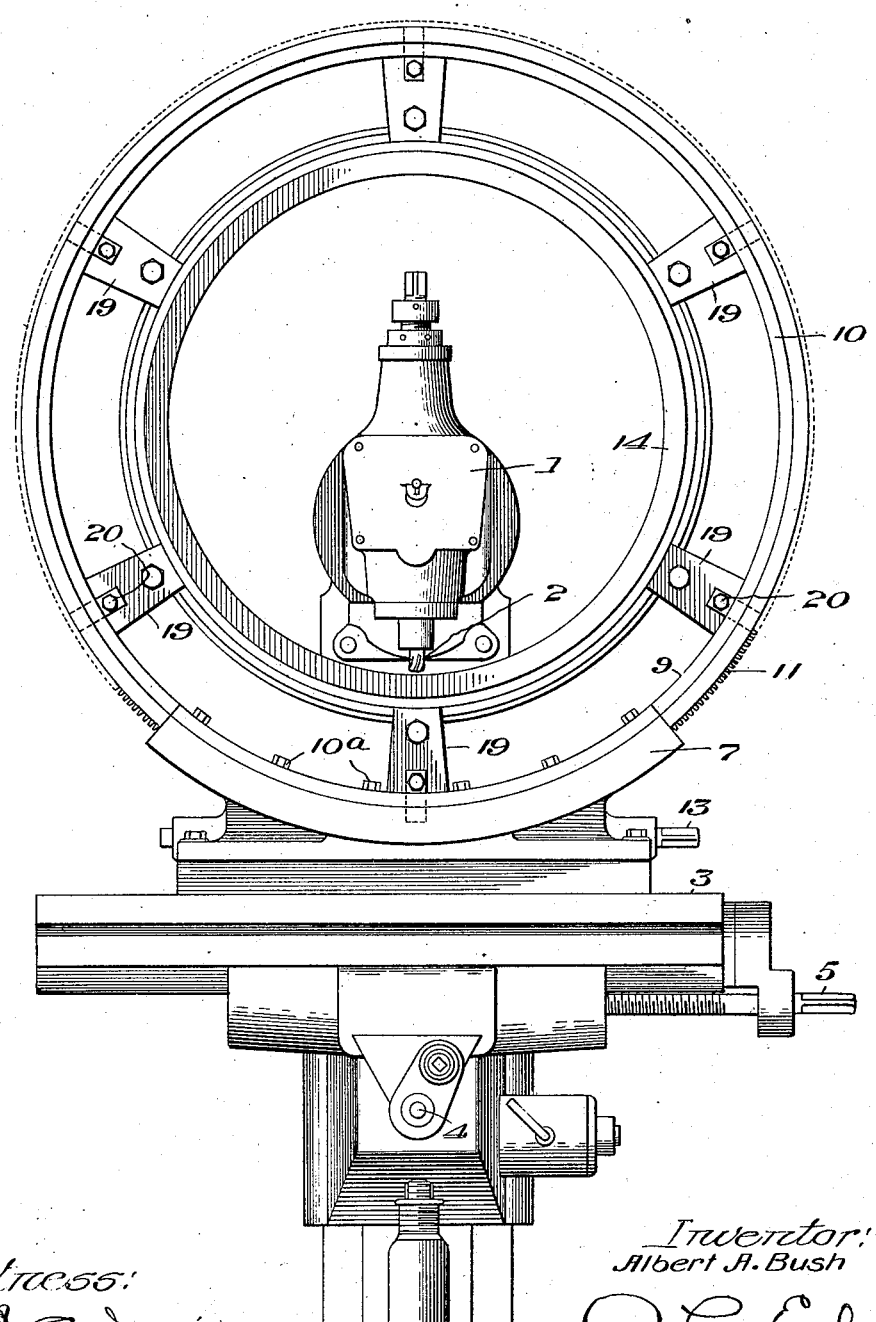

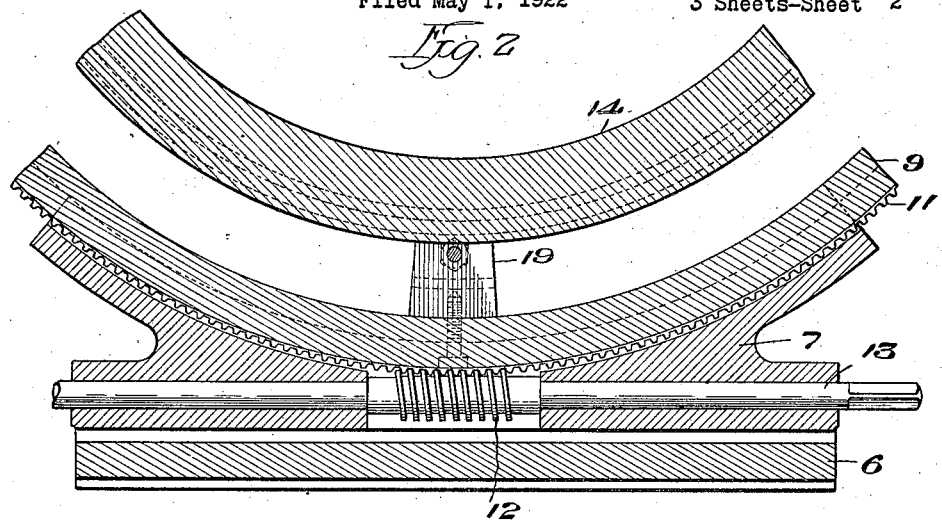
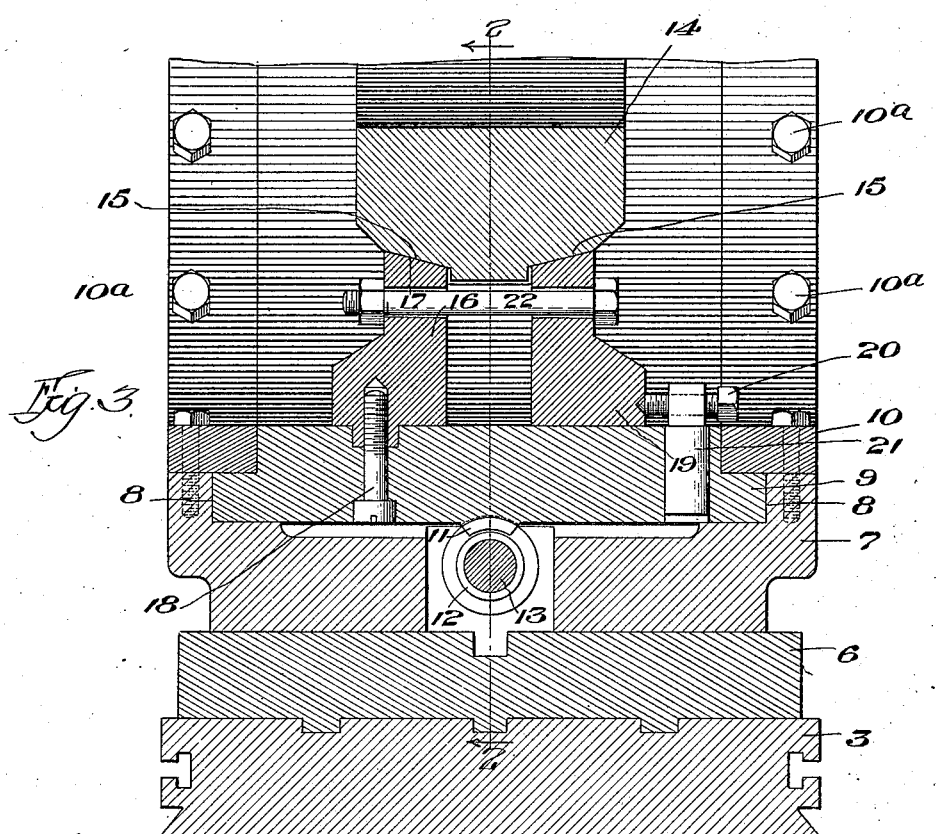

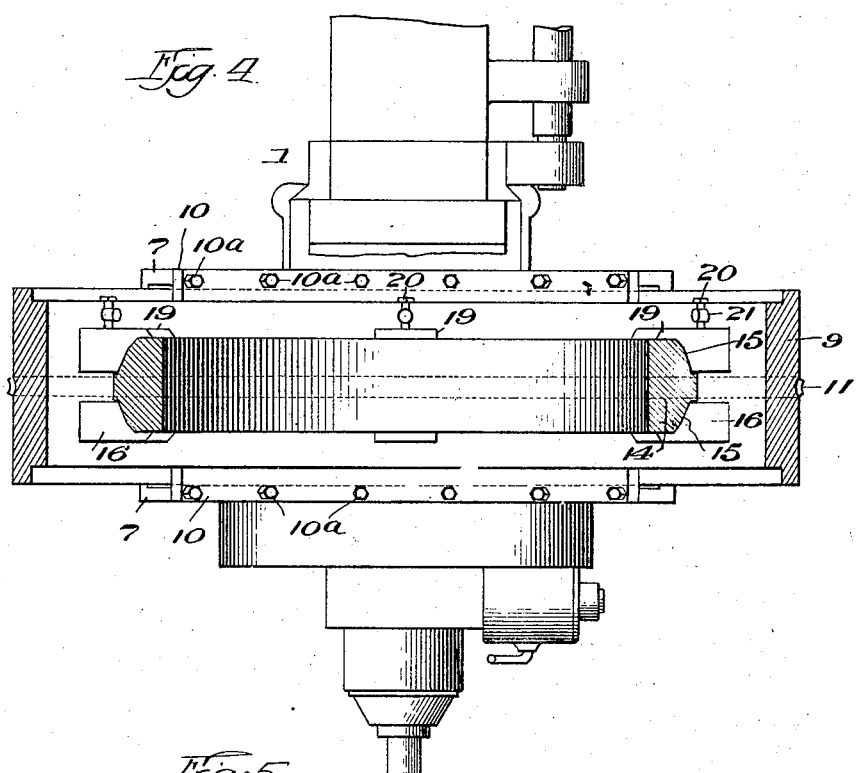
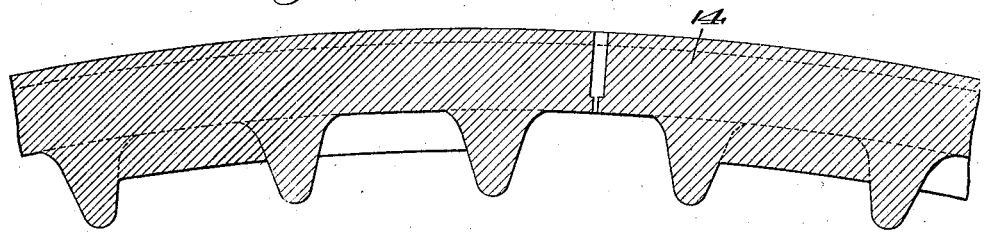
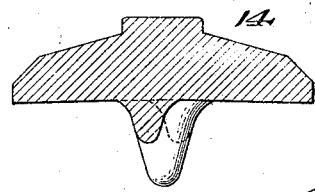
Inventor
Albert A. Bush

1,670,136

UNITED STATES PATENT OFFICE.

ALBERT A. BUSH, OF AKRON, OHIO, ASSIGNOR TO THE FIRESTONE TIRE AND RUBBER COMPANY, OF AKRON, OHIO, A CORPORATION OF OHIO.

RING-ENGRAVING MACHINE.

Application filed May 1, 1922. Serial No. 557,580.

This invention relates to an attachment for a milling or engraving machine, the purpose of the invention being to construct a jig or carrier, which is designed to support and rotate a work piece, such, for example, as a ring, so as to present it to a milling tool.

The particular purpose to which the present invention is directed is for cutting designs or figures on the interior of large steel rings such as used in molds to form the tread surface of tires. Heretofore, it has been customary to secure the rings on the milling machines with vises or clamps and after each cut is made on the interior of the ring to readjust and reclamp the ring to a new position. This has been a tedious operation, requiring considerable labor in handling the ring and in setting it accurately.

The present invention has for its object the provision of a device in which the ring can be mounted and by which the ring can be turned and set so as to obtain easy and accurate adjustment, the device being simple in construction and capable of being placed on any standard form of milling machine.

While the description given and the showing is detailed, it will be understood that such changes in detail or modifications as may be made without altering the invention or departing from the essentials thereof as set forth in the claims, are covered herein.

In the drawings:

Figure 1 is a front elevation of any standard form of milling machine with my attachment mounted thereon;

Figure 2 is a vertical section at the base of the ring holder on the line 2—2 of Figure 3;

Figure 3 is a transverse sectional view;

Figure 4 is a horizontal section through the ring holder;

Figure 5 is a fragmentary section of a ring illustrating the work to be done on the device;

Figure 6 is a transverse section thereof.

The invention herein disclosed is intended for attachment to and combination with any preferred form of milling machine or other cutting apparatus. In the present embodiment I have shown, somewhat conventionally, a standard milling machine having a head 1 in which is mounted a rotating milling cutter 2. Beneath the head is mounted the usual work holding slide or table 3 which is arranged to be moved longitudinally and transversely of the cutter head by screw feeds 4 and 5.

To the top of the slide or table is secured a bearing plate 6, on the upper surface of which is mounted an arcuate guide or cradle 7, in which are formed guideways 8 designed to receive the ring carrier or work holder 9, gibs 10 being secured on the cradle to hold the ring in position and being capable of locking the ring in position by tightening the bolts 10ª.

On the outer surface of the carrier is formed a series of gear teeth 11 which mesh with a worm 12 formed on a shaft 13 mounted in the cradle 7.

The mold ring which is intended to be cut or engraved is designated by the numeral 14, and the designs to be cut therein are of any form, certain ones being shown in Figures 5 and 6. The usual form of mold ring is provided with tapering or inclined surfaces on its outer periphery, such surfaces being indicated by the numerals 15, and these surfaces may be utilized conveniently for holding the mold ring in place, although for other types of rings different clamping devices could be substituted, the invention not being limited to the engraving of this particular type of ring.

In order to mount this mold ring on the interior of the rotating carrier 9, I provide a plurality of separated blocks or standards 16, the inner surfaces of which are tapered as at 17 to fit one of the tapered surfaces of the mold ring. The blocks are held in place by set screws 18. Opposite the stationary blocks 16 there are arranged a plurality of shiftable blocks 19, the inner surfaces of which are inclined in a reverse direction from the surfaces in blocks 16, the arrangement being such that as the blocks are drawn together the mold ring will be firmly clamped in position.

To draw the blocks together, there is provided on the inner surface a series of set screws 20 which are threaded in lugs 21 on the inner surface of the ring and bear against the bases of the blocks. The blocks are also tied together by transverse bolts 22 which pass through their inner ends.

It will be seen that the machine is intended to be operated in the following manner:

Approximate blocks 16 and 19 are mounted on the inner surface of the carrier ring and after the mold ring is securely clamped in place the carriage 3 is fed to present the work to the cutting tool. When a single cut has been made, the carrier ring is rotated the required distance to give the next cut, by rotation of the shaft 13. Any suitable means, as an indexing device, may be mounted on the shaft 13, such an expedient being well known in the art and therefore not being illustrated. By simultaneously rotating the shafts 4 and 13, any spiral figure may be cut in the ring, and any desired means may be provided to accomplish this purpose.

The mechanism shown and described saves considerable time and labor in the cutting of rings such as described and provides a more accurate means of spacing formations such as shown in Figures 5 and 6. It is easy to operate and will give a much larger production per machine.

What I claim is:

1. A machine including the combination with a milling cutter head of a cradle arranged adjacent said head, means for moving the cradle longitudinally of the head, an annular carrier in the cradle and extending about the head, means for circumferentially rotating the carrier, and means on the carrier for clamping a ring therein by engagement with the outer periphery thereof to present the inner periphery of the ring to the cutter.

2. A machine including the combination with a milling cutter head of a cradle arranged below said head, means for moving the cradle longitudinally of the head, an annular carrier in the cradle and extending about the head in a vertical plane, means for circumferentially rotating the carrier, and means on the carrier for clamping a ring therein by engagement with the outer periphery thereof to present the inner periphery of the ring to the cutter.

ALBERT A. BUSH.